United States Patent [19]

Hull et al.

[11] Patent Number: 5,585,632
[45] Date of Patent: Dec. 17, 1996

[54] WIDE-ANGLE INFRARED CLOUD IMAGER

[75] Inventors: Charles L. Hull; Siriluk Limmongkol; Walter A. Siegmund, all of Seattle, Wash.

[73] Assignee: University of Washington, Seattle, Wash.

[21] Appl. No.: 395,439

[22] Filed: Feb. 28, 1995

[51] Int. Cl.[6] .................................................... G01J 5/08
[52] U.S. Cl. ........................................ 250/334; 250/347
[58] Field of Search .................................. 250/334, 347, 250/330, 338.5

[56] References Cited

U.S. PATENT DOCUMENTS

| | | | |
|---|---|---|---|
| 3,617,105 | 11/1971 | Konrad | 350/6 |
| 3,704,372 | 11/1972 | Parker et al. | 250/202 |
| 3,748,014 | 7/1973 | Beiser | 350/7 |
| 3,749,928 | 7/1973 | Jamet et al. | 250/347 |
| 3,847,466 | 11/1974 | Forse | 350/7 |
| 3,876,302 | 4/1975 | Todt | 355/66 |
| 4,039,246 | 8/1977 | Voigt | 350/7 |
| 4,156,142 | 5/1979 | Hanson | 250/334 |
| 4,347,530 | 8/1982 | Stetson | 250/347 |
| 4,419,692 | 12/1983 | Modisette et al. | 358/113 |
| 4,461,565 | 7/1984 | Yamada | 355/8 |
| 4,658,140 | 4/1987 | Roll et al. | 250/347 |
| 4,682,029 | 7/1987 | Diepeveen et al. | 250/330 |
| 4,682,842 | 7/1987 | Brueggemann | 350/6.7 |
| 4,687,933 | 8/1987 | Loy | 250/334 |
| 4,733,072 | 3/1988 | Lettington | 250/235 |
| 4,776,654 | 10/1988 | Ishizuka et al. | 350/6.8 |
| 4,787,748 | 11/1988 | Rioux | 356/376 |
| 4,788,423 | 11/1988 | Cline | 250/235 |
| 4,800,271 | 1/1989 | Blais | 250/235 |
| 4,814,870 | 3/1989 | Crall | 348/168 |
| 5,170,276 | 12/1992 | Zinser | 359/202 |
| 5,173,796 | 12/1992 | Palm et al. | 359/202 |
| 5,225,923 | 7/1993 | Montagu | 359/199 |
| 5,235,438 | 8/1993 | Sasada | 358/481 |
| 5,255,190 | 10/1993 | Sznaider | 348/33 |
| 5,267,057 | 11/1993 | Sasada | 358/481 |
| 5,276,321 | 1/1994 | Chang et al. | 250/226 |

FOREIGN PATENT DOCUMENTS 1494805  6/1966  France .

OTHER PUBLICATIONS

Shields, J. E., et al., "Automated whole sky imagers for day and night cloud field assessment," *Optical Systems Group Technical Note* No. 234, 1993.

*Primary Examiner*—Carolyn E. Fields
*Attorney, Agent, or Firm*—Christensen O'Connor Johnson & Kindness

[57] ABSTRACT

A wide-angle infrared cloud imager that comprises a first and second mirrors driven by first and second stepping motors is disclosed. The first and second mirrors are rotated by the steps motors at axes orthogonal to each other. The first mirror directs reflected infrared radiation to the second mirror. Infrared radiation reflected from the second mirror is directed to an infrared radiation detector that outputs a signal directly proportional to the intensity of incident infrared radiation. The signal is provided to a computer for recording. The computer also provides the driving signal to drive the first and second motors.

8 Claims, 3 Drawing Sheets

WIDE-ANGLE INFRARED CLOUD IMAGER

FIELD OF THE INVENTION

This invention relates to an apparatus for analyzing cloud cover, and more particularly, towards an apparatus that provides an infrared image of cloud cover over a wide field of sky.

BACKGROUND OF THE INVENTION

Astronomers using telescopes for research purposes are dependent, at least for gathering visible light images, upon having a clear moonless night. Although little can be done about moonlight, astronomers have generally constructed telescopes in locations that have historically large numbers of clear cloudless nights. Nevertheless, when cloud cover does appear, it is important for the astronomer to obtain an objective indication as to the magnitude and extent of the cloud cover.

Astronomers have traditionally monitored cloud cover visually. On a moonlit night, an on-site astronomer can visually ascertain the extent of the cloud cover. However, visual monitoring of cloud cover is difficult under moonless night conditions, particularly when the cloud cover is comprised of thin high cirrus clouds that are nearly impossible to detect visually at night. Ironically, it is these moonless dark nights that are the most desirable for conducting astronomical research in the visible light spectrum.

Additionally, it is not unusual for astronomers to be controlling the telescope from a remote area, such as from a research laboratory thousands of miles away from the telescope. In this case, obviously it is impossible for the astronomer to ascertain the degree of cloud cover present over the telescope. Although at large research telescopes, a telescope assistant is available to provide information on cloud cover, this communication is a poor substitute for an objective cloud image that can be analyzed by the astronomer.

One prior art method of monitoring cloud cover are sensitive video cameras operating in the thermal infrared spectrum. Unfortunately, commercially available cameras have relatively narrow fields of view as limited by the fixed camera lens, are not intended for continuous operation, and are often times prohibitively expensive.

SUMMARY OF THE INVENTION

A wide-angle infrared cloud imager includes a first mirror driven by a first motor. The first motor is a stepping motor that can rotate the first mirror at well-defined incremental steps over a wide angle and along a first axis. The first mirror directs reflected infrared radiation to a second mirror. The second mirror is driven by a second stepping motor. In addition, the first motor and the first mirror moves in fixed relation with the second mirror as it is being driven by the second stepping motor. The second motor is also a stepping motor that can rotate the second mirror at well-defined incremental steps over a wide angle and along a second axis. The second axis is orthogonal to the first axis.

Infrared radiation reflected from the second mirror is incident upon a fixed parabolic mirror. The parabolic mirror reflects the infrared radiation to an infrared radiation detector. The detector outputs a signal directly proportional to the intensity of incident infrared radiation. The signal is provided to a computer for recording. In addition, the computer provides the driving signal to drive the first and second motors.

In operation, the first mirror is incremented through a predetermined angle by the first motor. At each step, the detector outputs the signal which is stored by the computer. After the first motor completes its predetermined range of motion, the second motor makes one incremental step. This processes is repeated until the second motor has completed its predetermined range of motion.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
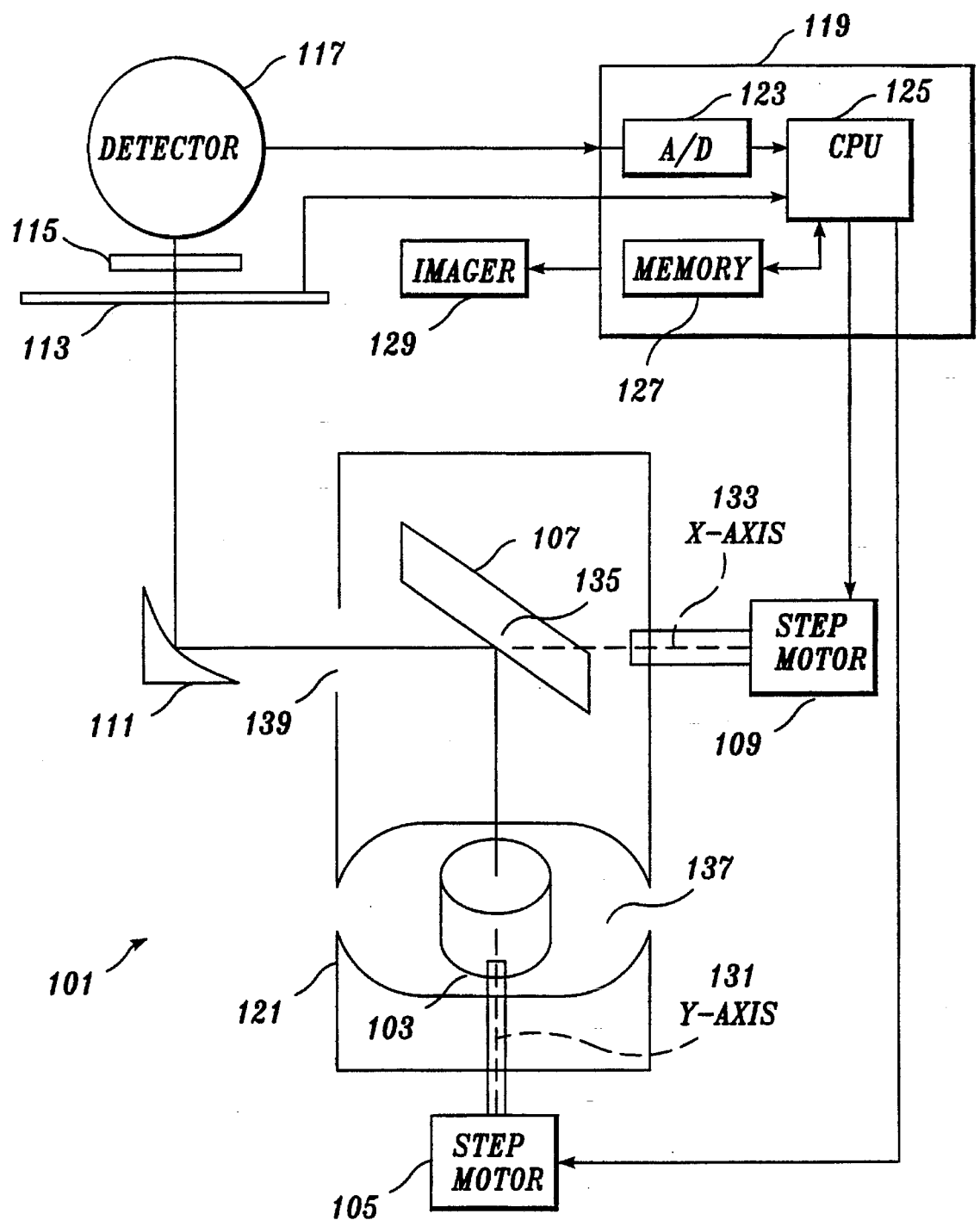
FIG. 1 is a schematic top-view of a cloud imager formed in accordance with the present invention.
Figure 2:
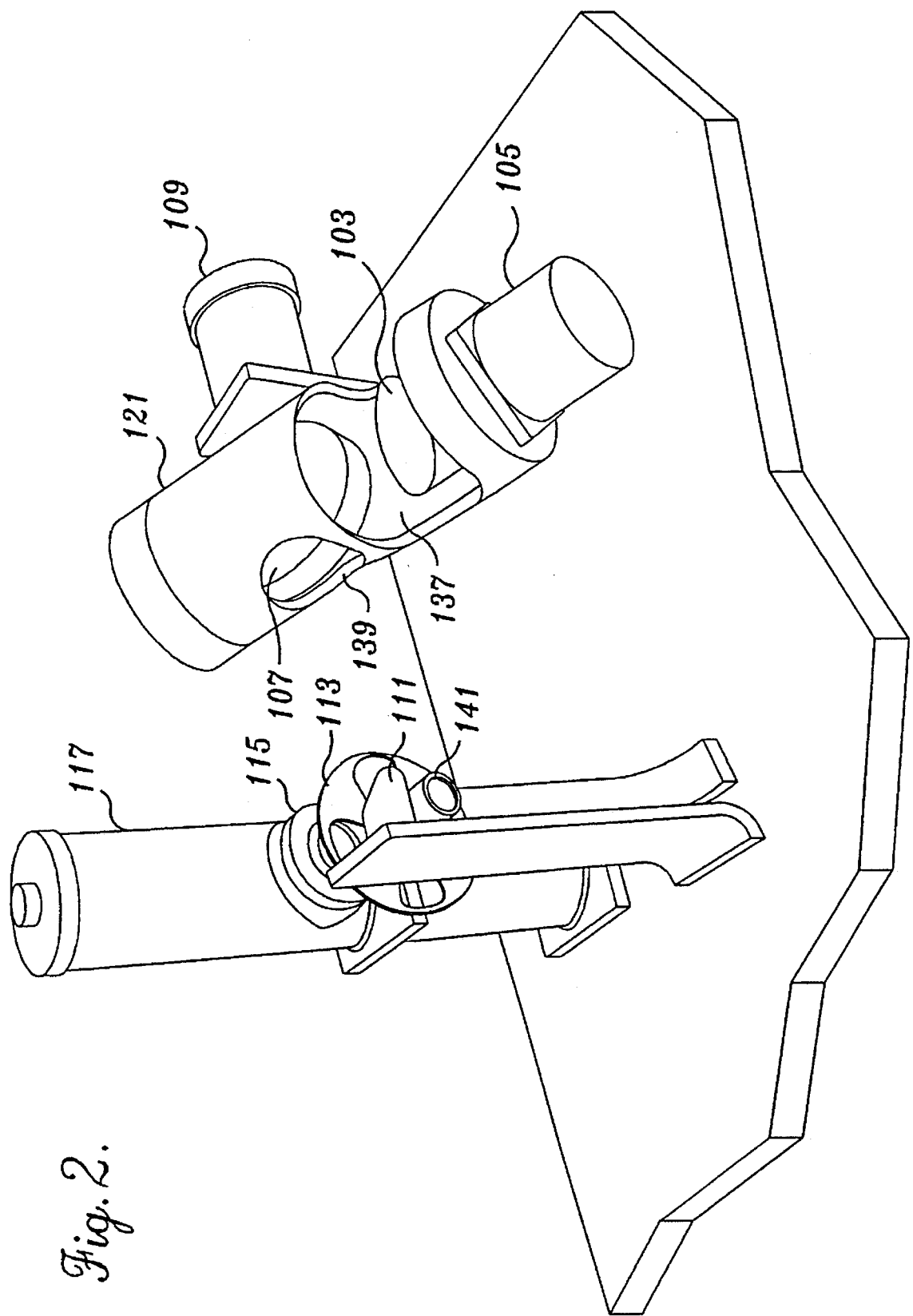
FIG. 2 is an isometric view of a cloud imager formed in accordance with the present invention.

As seen in FIGS. 1 and 2, the apparatus 101 of the present invention includes a first mirror 103, a first stepping motor 105, a second mirror 107, a second stepping motor 109, an off-axis parabolic mirror 111, a chopper 113, a filter 115, a detector 117, a computer 119, and an imager 129.

The first mirror 103 is mounted onto the shaft of first stepping motor 105. The shaft of first stepping motor 105 is collinear with an y-axis 131. Thus, first stepping motor 105 rotates first mirror 103 about y-axis 131. First mirror 103 and first stepping motor 105 are all fixedly attached to a cylindrical housing 121. The cylindrical housing 121 holds first mirror 103 and first stepping motor 105 in fixed relation to each other and to the cylindrical housing 121 itself. Also secured to cylindrical housing 121 is second mirror 107. Thus, second mirror 107, first stepping motor 105, and cylindrical housing 121 are all fixed in relation to each other. In addition, first mirror 103 rotates about y-axis 131. Further, reflected infrared radiation from first mirror 103 impacts on second mirror on a reflection point 135. It can be appreciated that the reflection point 135 is simply the intersection point of the y-axis 131 and the x-axis 133 intersect. Infrared radiation is reflected by second mirror 107 at various points along the surface of the mirror. In the preferred embodiment, the first and second mirrors 103 and 107 are flat mirrors that are elliptically shaped. Because the mirrors 103 and 107 are mounted on a 45° angle to the y-axis 131 and an x-axis 133, respectively, the mirrors are elliptically shaped to provide a circular cross section along the axes. In the preferred embodiment the mirrors 103 and 107 are Model No. A32090 manufactured by Edmund Scientific Company, Barrington, N.J.

Cylindrical housing 121 is attached to the shaft of second stepping motor 109. The shaft of second stepping motor 109 is collinear with x-axis 133. Thus, second stepping motor 109 rotates cylindrical housing, and all of its associated fixedly attached apparatus, about x-axis 133. The first and second stepping motors 105 and 109 are Model No. 5609L-03 and Model No. 5609-06, respectively, both from United Motion Technology, Santa Clara, Calif.

Infrared radiation from the sky impacts on first mirror 103 through an opening 137 in the cylindrical housing 121. The infrared radiation is reflected by first mirror 103 to second mirror 107 along a direction substantially parallel to y-axis 131 until the radiation impacts on second mirror 107. Second mirror 107, in turn, reflects the infrared radiation out an opening 139 to parabolic mirror 111 along a direction substantially parallel to x-axis 133. The parabolic mirror 111 is an off-axis parabolic mirror. As is known by those skilled in the art, the off-axis parabolic mirror reflects the substantially parallel infrared radiation from second mirror 107 and focuses the infrared radiation to a focal point. From parabolic mirror 111, the infrared radiation passes through chopper 113 and filter 115 to detector 117. As is known by those skilled in the art, the use of the chopper 113 is necessary because the detector 117 requires a modulated input signal in order to operate effectively.

In the preferred embodiment, the parabolic mirror 111 is coated with a thin film of gold and has a a focal length of approximately 50 mm. Additionally, the detector 107 has its front detecting surface located at the focal point of the parabolic mirror 111. A suitable mirror is the Model No. A8037-102, manufactured by JANOS Technology, Inc. Alternatively, the parabolic mirror 111 may be replaced with a lens for focusing the infrared radiation through chopper 113, filter 115, and onto detector 117. However, lenses for refracting infrared radiation are typically formed from zinc-selenide or germanium are somewhat more expensive. Further, in the preferred embodiment, first and second mirrors 103 and 107 are coated with a thin film of gold. This enhances the reflectivity of the mirror in the infrared spectrum.

The chopper 113 is machined out of polycarbonate and is also coated with a thin film of gold. The gold-coated chopper wheel reflects both the cold interior and warm exterior of the dewar of the detector back to the detector. It is positioned so that the reference flux detected by detector 117 is approximately the same as the cirrus clouds to be imaged. In addition, chopper 113 includes four apertures that allow the infrared radiation to pass therethrough. The chopper is driven by a brushless DC motor 141 that is expected to allow at least 3 years of continuous operation between replacements. A suitable motor is the Model No. 26BC-6A 110.1 manufactured by Portescap U.S., Inc., Hauppauge, N.Y.

The filter 115 is placed behind the chopper 113 and in front of detector 117. Filter 115 is a bandpass filter that allows radiation in the 10 μm range pass through. It has been found that the atmosphere is generally transparent to infrared radiation in the 8 μm–13 μm wavelength range in the absence of clouds. In the presence of clouds, relatively large amounts of infrared radiation in this bandwidth is present, due to the fact that water droplets and ice crystals in the clouds tend to generate the infrared radiation. Thus, this wavelength is ideal for the detecting and imaging of clouds. The 10 μm wavelength was chosen as being optimal for imaging cloud cover.

Detector 117 has an active area of approximately 0.5 mm square. Combined with the 50 mm focal length of parabolic mirror 111, this corresponds to approximately a 0.6° square portion of the sky. In the preferred embodiment, detector 117 is a liquid-nitrogen-cooled Hg-Cd-Te detector adapted to detect infrared radiation in the 10 μm range. One detector suitable is the Model No. 1040064, MCT 0.5 mm sq. 10–11.4 μm manufactured by Graseby Infrared, Orlando, Fla.

In operation, infrared radiation enters through opening 137 and impacts upon first mirror 103. The infrared radiation is reflected to second mirror 107 which reflects the infrared radiation through opening 139 to parabolic mirror 111. Parabolic mirror 111 focuses the infrared radiation through chopper 113 and filter 115 until impacts upon the window of detector 117. Upon impact upon detector 117, detector 117 produces a signal that is transmitted to computer 119 and recorded. In particular, the computer 119 includes an analog-to-digital converter (A/D)123, a CPU 125, and memory 127. Signals provided by detector 117 are provided to A/D 123 which converts the analog signal provided by detector 117 into digital format. The signal is provided to CPU 125 which then stores the signal in memory 127. Memory 127 serves to store all of the signals output by detector 117 for later transfer to imager 129 for display. The signal is indicative of the intensity of the infrared radiation impacting upon the detector 117. The signal from detector 117 is transferred over a standard RS232 serial interface.

Figure 3:
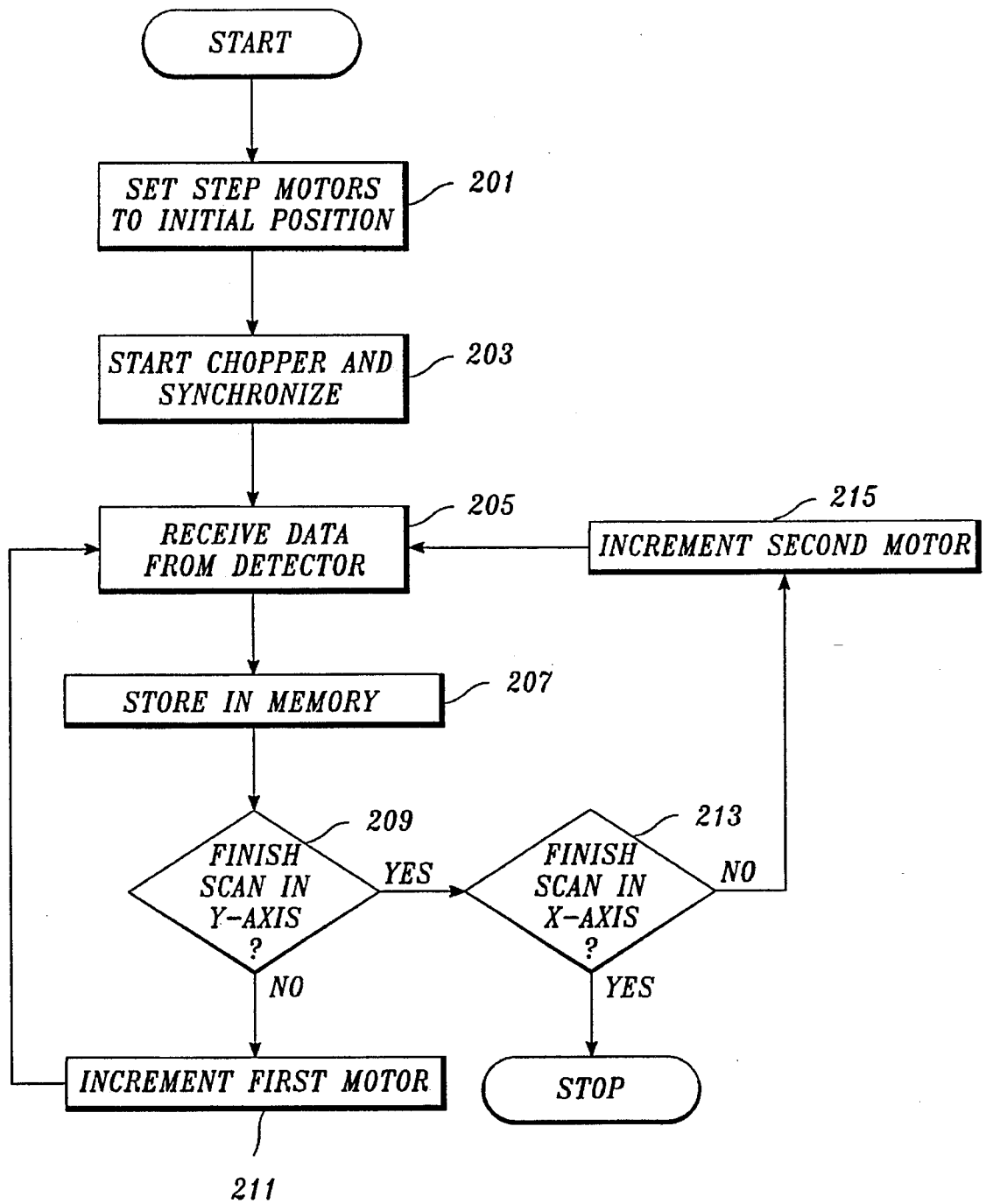
FIG. 3 is a flow diagram illustrating the operation of the apparatus of the present invention.

The scanning aspect of the apparatus 101 is handled by computer 119. CPU 125 provides outputs that drive the stepper motors 105 and 109. Turning to FIG. 3, at box 201, computer 119 directs first and second stepping motors 105 and 109 to set themselves into the initial starting position. The initial starting position is typically at one end of the predetermined range of motion of the stepping motors. Next, at box 203, computer 119 directs the chopper 113 to begin rotation at a predetermined frequency, which in the preferred embodiment is 100 Hz. In addition, the chopper rotation must be synchronized with the rate of incrementation of the stepping motors. To facilitate the synchronization, chopper 113 provides a one pulse per revolution signal to the CPU 125. The signal from chopper 113 is provided to computer 119 by means of an electrical communicative link. The CPU 125 uses this signal to maintain synchronization of the stepping motors. Because in the preferred embodiment the chopper rotates at 100 Hz and the chopper 113 has four apertures, the computer should operate stepping motors 105 at 400 increments per second. This allows infrared radiation received when the first stepping motor 105 is in each incremental position to pass through chopper 113 coinciding when an aperture of chopper 113 is aligned with the detector 117.

Next, at box 205, as the infrared radiation is incident upon detector 117, the detector 117 provides a signal that is captured by the A/D 123 of computer 119. At box 207, the data is stored in memory 127 of computer 119. Next, at box 209, a determination is made as to whether the first stepping motor 105 has reached the completion of its predetermined range of motion about the y-axis 131. If not, then at box 211, computer 119 increments the first stepping motor 105 and control is returned to box 205 for further signal gathering.

If, on the other hand, the first stepping motor 105 has completed its range of motion, next at box 213, a determination is made as to whether the second stepping motor 109 has reached the completion of its predetermined range of motion about the x-axis 133. If yes, then the data gathering procedure is complete for this particular cloud cover image. The data gathered can then be loaded into imager 129 for display as a visual image.

If the second stepping motor 109 has not completed its range of motion, then at box 215, the computer 119 directs second stepping motor 109 to increment one step and control is returned to box 205 where data gathering continues. It should be noted that in the preferred embodiment, the first stepping motor 105 is not "reset" to the original starting position alter the second stepping motor 109 is incremented. Rather, first stepping motor 105 is "incremented" in the reverse direction is alternate scan lines. Therefore, the term "increment" of box 211 should not be meant as rotating first mirror 103 in a predetermined direction. Instead, the term "increment" means the advancement of the first stepping motor 105 in a certain direction. Nevertheless, it can be appreciated that in an alternative embodiment, the first stepping motor 105 may be reset to the initial starting position at box 215.

In the preferred embodiment, the first stepping motor 105 is directed by computer 119 to increment at steps of 0.45°. As noted above, the frequency of the incrementation of the stepping motors is 400 Hz. In one actual embodiment, the predetermined angle range is 135°. Therefore, one line of scan involves 300 increments and thus it takes 0.75 seconds to finish one line of scan. The image provided by apparatus 101 is 300×300. Therefore, it would take 225 seconds or 3 minutes 45 seconds to complete one cloud cover image of the sky spanning 135°×135°. The second stepping motor 109 is also set to step through 300 increments of 0.45° to provide a angle range of 135°. All signals from computer 119 to imager 129 and the stepping motors 105 and 109 are transferred over a standard RS232 serial interface.

This scanning scheme generates scan lines much like lines of constant longitude or latitude on a globe, depending upon how the apparatus 101 is oriented with respect to the earth. This pattern allows the image to be displayed directly without remapping, albeit with a little distortion. The distortion is that of the familiar Mercator world map. Successive lines are scanned in opposite directions to eliminate the dead-time during retrace. The scanner covers the sky down to 2.5 air masses, which corresponds to approximately 23° from the horizon. It can be appreciated that scan areas can be predetermined for any rectangular region on the sky simply by control of the first and second mirrors 103 and 107 by computer 119. Scans progress one line at a time as the first mirror 103 cycles through its predetermined range.

In addition, in an actual embodiment, the average of the previous four values taken when the chopper wheel reflects the reference surface, i.e., when the apertures are not aligned with the detector, inside the dewar is subtracted from each sky pixel. This removes any variation in the reference signal that might be due to nonuniformities in the reflective surface of the chopper wheel.

The lowest layer in the atmosphere, referred to as the troposphere, contains 90% of the air and 99% of the water vapor of the atmosphere. Most cloud cover is found in this layer. The troposphere extends upward from the surface to the tropopause, a layer of minimum temperature. At 30° latitude, the tropopause is approximately 14 km above the surface of the earth. In the troposphere, the temperature typically decreases with height and strong convection occurs under favorable conditions. The convection transports water vapor throughout the troposphere. Adiabatic cooling, associated with the convection, causes condensation of water droplets and ice crystals to form clouds. Cold cirrus clouds that form high in the troposphere are the most difficult clouds to detect since they may be optically quite thin and very cold.

As is well known to those skilled in the art, the radiation intensity from a black body is:

$$B_\lambda = \frac{2hc^2}{\lambda^5} \frac{1}{(e^{hc/k\lambda T} - 1)}, \quad (1)$$

where h is the Planck constant, c is the speed of light, $\lambda$ is the wavelength of interest, k is the Boltzmann constant and T is the temperature of the black body, and $B_\lambda$ is the flux. In this case, the cloud cover is approximated as a black body and T is the temperature of the cloud cover and $\lambda$ is 10 µm.

For an optically thin cloud, Eq. (1) must be multiplied by the optical depth of the cloud. Ideally, a cloud imager would detect clouds with an optical depth of down to 0.01 and a temperature of −66° C., the temperature minimum of the tropopause at 30° latitude. The term "optical depth" is a measure of the opacity of an interceding material. It has been found that the flux from such a cloud is typically $1.3 \times 10^4$ µW·m$^{-2}$·sr·µm$^{-1}$, using Eq. (1) above. A cloud thinner than this is not likely to be a problem since photometry is normally limited to about 1% accuracy by other problems.

At a dry, high elevation site, it has been found that the clear sky emits somewhere between 50 to $100 \times 10^4$ µW·m$^{-2}$·sr·µm$^{-1}$ in the 8 µm–13 µm wavelength range. This radiation is primarily from water vapor and ozone. See for example Kryskowski and Suits, "Natural Sources," *Infrared and Electro-Optical Systems Handbook: I. Sources of Radiation*, pp. 137–314 (1993).

An additional source of "background" radiation is the window of the detector, as well as the first and second mirrors 103 and 107 and the parabolic mirror 111. Using 9% total emissivity at an ambient air temperature of 15° C., these optics will contribute about $70 \times 10^4$ µW·m$^{-2}$·sr·µm$^{-1}$ to the background radiation levels.

Cooled and shielded detectors, such as detector 117, are normally background limited in the infrared radiation spectrum. For the detector 117, the noise equivalent power, i.e., the power incident on the scanner needed to provide a signal to noise ratio of one (1) is:

$$NEP = \frac{hc}{\lambda} \left\{ \frac{2}{\eta} A_d \Delta f B \lambda \frac{\lambda}{hc} \Omega \Delta \lambda \right\}^{\frac{1}{2}} \quad (2)$$

where $\eta$ is the efficiency of the optics and detector, $A_d$ is the detector area, $\Delta f$ is the frequency bandwidth of the system, $\Omega$ is the solid angle of the parabolic mirror as seen from the detector, and $\Delta \lambda$ is the bandpass of the optical system. This noise equivalent power can be converted into a noise intensity, $B_n$, from the sky, and compared to the signal from a thin cold cloud.

$$B_n = \frac{hc}{\lambda} \left\{ \frac{2}{\eta} \frac{\Delta f}{A_d \Omega \Delta \lambda} B \lambda \frac{\lambda}{hc} \right\}^{\frac{1}{2}} \quad (3)$$

Using the figures from Table 1 below and for total worst case background intensity of $170 \times 10^4$ µW·m$^{-2}$·sr·µm$^{-1}$, we find $B_n = 19$ µW·m$^{-2}$·sr·µm$^{-1}$. For a photoconductive detector, recombination noise increases this number by $\sqrt{2}$. See for example, Crowe, Norton, Limperis and Mudar, "Detectors," *Infrared and Electro-Optical Systems Handbook: III. Electro-Optical Components*, pp. 175–283 (1993) and Bell, Eisner, Young and Oetjen, "Spectral Radiance of Sky and Terrain at Wavelengths Between 1 and 20 µm," *Journal of the Optical Society of America* 50: II. Sky Measurements, pp. 1311–1320 (December 1960).

$B_n$ is many times much smaller than the typical intensity from a thin cirrus cloud. This implies that such cloud cover comprised of thin cirrus clouds can be detected easily with a very high signal to noise ratio.

TABLE 1

| IR Scanner Parameters | |
| --- | --- |
| Parameter | Value |
| $A_d$ | $0.25 \times 10^{-6}$ m$^2$ |
| $\lambda$ | 10.6 µm |

TABLE 1-continued

IR Scanner Parameters

| Parameter | Value |
| --- | --- |
| $\Delta\lambda$ | 1.6 μm |
| f/ratio | 2 |
| $\eta$ | 0.8 |
| $\Delta f$ | 2000 Hz |
| $\Omega$ | 0.20 sr |

It is known that the sun's intensity of radiation is $3.5\times10^9$ $\mu W \cdot m^{-2} \cdot sr \cdot \mu m^{-1}$ and the full moon's intensity is $2.4\times10^7$ $\mu W \cdot m^{-2} \cdot sr \cdot \mu m^{-1}$. Neither is well-resolved but both are easily detected. The planets are not resolved so their effective intensity is reduced by the ratio of the apparent solid angle of the planet to the solid angle of the scanner beam. However, Venus should be detected easily and Mercury and Mars under favorable conditions. The brightest astrophysical sources (outside the solar system), at about 20 $\mu W \cdot m^{-2} \cdot sr \cdot \mu m^{-1}$ diluted by the solid angle of the scanner beam, are too faint to be detected. This is a significant advantage of obtaining cloud images at the infrared wavelength, i.e., the interpretation of cloud images is not obfuscated by background sources.

The infrared radiation intensity from cloud cover depends both on its temperature and its optical depth. With measurements at only one wavelength, these effects cannot be separated. However, measurements at two separate wavelengths allow this to be done since temperature change affects the ratio of the two measurements, while an optical depth change does not affect the ratio if the cloud opacity is the same at the two wavelengths. Therefore, in an alternative embodiment, the apparatus is configured to scan the sky at two different wavelengths. Suitable wavelengths are 11.5 μm and 13.0 μm where the imaginary components of the ice index of refraction are nearly equal. A dichroic mirror is substituted for the parabolic mirror 111. The dichroic mirror is used to split the beam and to direct it to two separate detectors.

Thus, the present invention provides a cloud image of a wide field of the sky in near real-time. This cloud image not only can be used in planning and interpreting astronomical observations. The cloud image is useful in better protecting the telescope from precipitation with continuously updated cloud images. In addition, the cloud images can be saved and used in data analysis and interpretation. Also, the cloud images can be used to quantify the cloud cover and provide resulting statistical data to help describe the quality of a site.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An infrared cloud imaging system comprising:

a first mirror mounted to rotate about a first axis;

a first motor attached to said first mirror for rotating said first mirror about said first axis, said first motor capable of moving through a first predetermined range of motion;

a second mirror mounted to rotate about a second axis, said second axis orthogonal to and intersecting with said first axis;

a housing holding said first mirror and said second mirror in fixed relation to each other;

a second motor attached to said second mirror for rotating said second mirror and said first mirror about said second axis, said second motor capable of moving through a second predetermined range of motion;

a detector for outputting signals indicative of intensity of incident infrared radiation; and an imager for displaying an image based on said detector signals;

wherein infrared radiation incident upon said first mirror is reflected to said second mirror, further wherein infrared radiation incident upon said second mirror is reflected by said second mirror to said detector.

2. The imaging system of claim 1 wherein said detector is a cooled Hg-Cd-Te detector.

3. The imaging system of claim 1 wherein said first motor and said second motor are stepping motors.

4. The imaging system of claim 3 further including a computer for receiving said signals from said detector, said computer also controlling said first and second stepping motors.

5. The imaging of claim 1 further including a filter disposed in front of said detector for allowing radiation having a wavelength of substantially 10 μm pass therethrough.

6. The imaging system of claim 1 further wherein a parabolic mirror is disposed between said second mirror and said detector, said parabolic mirror directing and focusing said infrared radiation from said second mirror to said detector.

7. An infrared cloud imaging system comprising:

a first mirror mounted to rotate about a first axis;

a first stepping motor attached to said first mirror for rotating said first mirror about said first axis, said first motor capable of moving through a first predetermined range of motion through steps having a first predetermined step interval;

a second mirror mounted to rotate about a second axis, said second axis orthogonal to and intersecting with said first axis;

a housing holding said first mirror and said second mirror in fixed relation to each other;

a second motor attached to said second mirror for rotating said second mirror and said first mirror about said second axis, said second motor capable of moving through a second predetermined range of motion through steps having a second predetermined step interval;

a parabolic mirror for reflecting infrared radiation;

a detector a computer, and an imager, wherein infrared radiation incident upon said first mirror is reflected to said second mirror, infrared radiation incident upon said second mirror is reflected to said parabolic mirror, infrared radiation incident upon said parabolic mirror is reflected to said detector, said detector outputting signals indicative of the infrared radiation intensity incident on said detector, said signals passed to said computer for storage, and wherein said imager retrieves said signals from said computer and produces an image.

8. The imaging system of claim 7 further including a filter and a chopper disposed between said parabolic mirror and said detector, said filter operating to only allow infrared radiation having a predetermined wavelength therethrough.

* * * * *